July 30, 1957
E. G. LINDER
2,801,389
HIGH ENERGY BOMBARDMENT-INDUCED-CONDUCTIVITY
CONTROL OF ELECTRICAL CIRCUITS
Filed Nov. 18, 1952
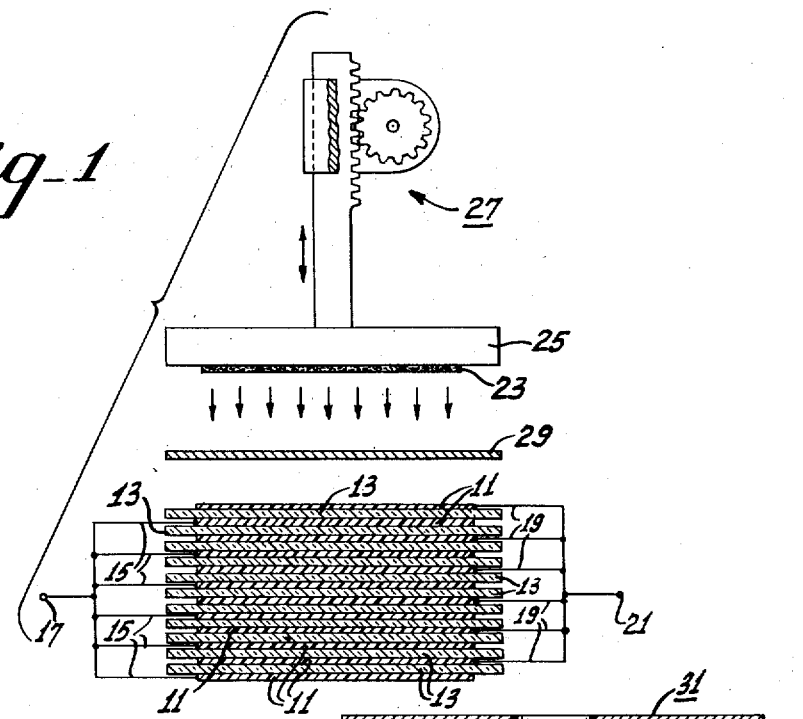
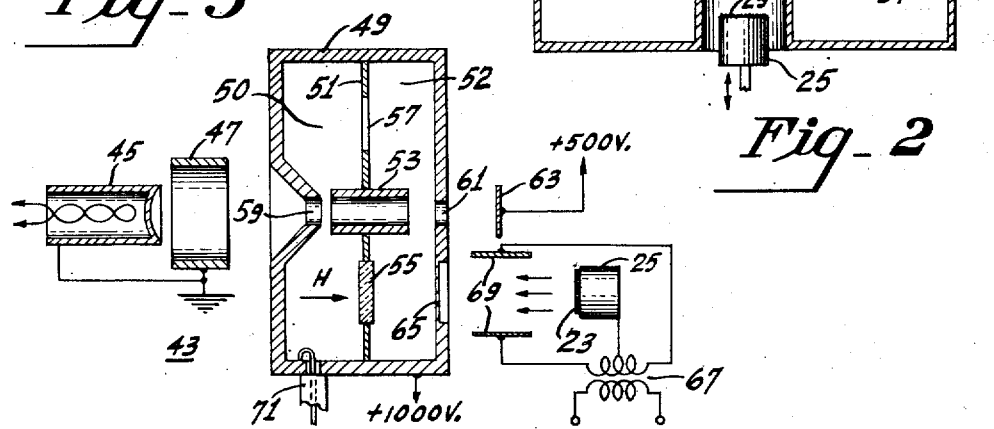
INVENTOR.
Ernest G. Linder
BY
ATTORNEY

United States Patent Office 2,801,389
Patented July 30, 1957

2,801,389

HIGH ENERGY BOMBARDMENT-INDUCED-CONDUCTIVITY CONTROL OF ELECTRICAL CIRCUITS

Ernest G. Linder, Princeton, N. J., assignor, by mesne assignments, to the United States of America as represented by the Secretary of the Air Force Application November 18, 1952, Serial No. 321,245

15 Claims. (Cl. 332—68)

This invention relates generally to the utilization of cold sources of high energy radiation and more particularly to the utilization of high energy emission from such primary sources for effecting control of electrical circuits.

It has been found that electron bombardment of dielectric materials including semiconductors results in a change in the electrical conductivity of the bombarded materials. See L. Pensak, vol. 75 of the Physical Review, pp. 472–478 (February 1949). While this effect, commonly referred to as bombardment-induced-conductivity, presently is utilized for image translation and other purposes in electrical storage tubes and similar apparatus, no apparatus is known which has been devised primarily to effect the control of electrical circuits.

An object of the invention is to provide improved methods of and means for utilizing cold sources of high energy radiation.

Another object of the invention is to provide improved methods of utilizing the energies of neutral high energy radiations.

Another object is to provide improved means for utilizing high energy radiations effecting control of electrical circuits.

Another object of the invention is to utilize the principles of bombardment-induced-conductivity for controlling electrical circuits.

A further object of the invention is to provide improved methods and means for amplitude and frequency modulating cavity resonators.

A further object is to provide improved methods and means for varying or controlling the electrical conductivity and/or dielectric constant of electrical circuit elements.

A still further object of the invention is to provide simplified means for tuning cavity resonators.

In accordance with the present invention a cold source of high energy radiations is employed to control the electrical conductivity and dielectric constant of certain materials. By utilizing the extremely high energies of either charged (alpha particles, beta particles, etc.) or uncharged (neutrons, gamma rays, and the like) high energy radiations, these materials may be bombarded to produce appreciable changes in their dielectric constant and conductivity. By controlling these characteristics various desired results may be achieved. Included among these results are the controlling of the capacity of a circuit element which includes as a component part thereof a dielectric or similar material. The capacity of such an element readily may be controlled, as hereinafter set forth, even though the element ordinarily is inaccessible or located within a glass or metal envelope. Also, the dielectric constant and/or electrical conductivity of a material may be modulated in a desired manner to frequency modulate and amplitude modulate a cavity resonator.

The invention will be described in detail with reference to the accompanying drawing in which:

Figure 1 is a cross-sectional elevational view and partially schematic diagram of a circuit element having a controllable dielectric constant, according to the invention;

Figure 2 is a schematic diagram, partially in cross-section, of a cavity resonator which may be amplitude and frequency modulated in accordance with the invention; and Figure 3 is a further embodiment of the invention wherein a deflection field is utilized in amplitude and frequency modulating a cavity resonator.

Similar reference characters are applied to similar elements throughout the drawing.

Referring to Figure 1 of the drawing, a plurality of electrically conductive electrodes 11 are arranged in a "stacked" spaced relation. Disposed between adjacent ones of these conductive electrodes are dielectric or semiconductive members 13 which preferably extend beyond and overlap the conductive electrodes. Electrodes 11 may be formed from a suitable conductive material such as aluminum foil. The members 13 may comprise, for example, sheets of polystyrene or mica, and the semiconductors include materials such as germanium, silicon, and the like. Preferably the conductive electrodes 11 are mounted in a parallel equi-spaced relation and the dielectric sheets 13 interspersed therewith and may be in physical contact with the electrodes 11 so that a compact unit or "sandwich" is formed. Alternate ones of the conductive electrodes 11 are electrically joined by means of leads 15 and the electrodes connected to a first output terminal 17. In a like manner the remaining or conjugate alternate ones of the conductive electrodes 11 are electrically joined by means of leads 19 and these electrodes brought out to a second output terminal 21. The apparatus thus far described effectively comprises a capacitor having a predetermined capacitance which is determined in part by the dielectric members 13.

Spaced from the capacitor fabricated in the manner described above is a cold source 23 of primary high energy radiation. The source 23 is mounted on a radiation support member 25 which is actuated by a rack and pinion 27 or other convenient means to control the position of the source relative to the capacitor. The high energy radiations produced by the source may comprise either charged particle or neutral emissions. Suitable source materials in each instance may be strontium$^{90}$, a beta particle emitter, or cobalt$^{60}$, a gamma ray emitter.

Bombardment of the dielectric sheets 13 with the high energy particles or rays from the cold source 23 results in free charges being created within the dielectric material. This is true because a unit of entering high energy radiation creates many free electrons within the dielectric either by ionization processes or by raising electrons from filled energy bands to conduction bands. This effect (i. e., the creation of free electric charges in the dielectric) may be enhanced by using a charged particle source rather than a neutral radiation source since some or all of the charged particles penetrating the dielectric material are trapped and remain therein as free charges. The conductivity of the dielectric material is determined by controlling the intensity of bombardment. By intensifying such bombardment and creating a large number of free electric charges the dielectric constant of the each dielectric sheet is changed to a value different from the constant value when not subjected to bombardment.

Thus the apparatus heretofore described comprises a controllable capacitor having a controllable dielectric constant. The capacitor may be located either within or without an envelope and incorporated in an electrical circuit. The capacity of the device readily may be controlled as desired either by adjusting the position of the source relative to the capacitor hence controlling the amount of radiation which penetrates the capacitor or by interposing an absorber 29 such as lead or cadmium between the source and the device. The utilization and bombardment of the semiconductive materials mentioned above may be desirable since their conductivity range is substantially different from the conductivity range of more conventional dielectric materials.

Referring to Figure 2 a further embodiment of the invention is shown wherein either or both amplitude and frequency modulation of a cavity resonator may be achieved in accordance with the invention. In this example a toroidal re-entrant cavity resonator 31 is shown having a re-entrant section 33 and input and output coupling loops 35 and 37, respectively for coupling energy into and out of the resonator. Electrical energy coupled into the resonator via the input coupling loop 35 "energizes" the resonator such that the mode configuration of electric and magnetic field lines set up therein results in high electric field stress across the re-entrant resonator section 33. Positioned in and subjected to this high electric field stress is a disk 39 of a dielectric or other material of the type hereinbefore discussed. The disk 39 preferably is supported by one of the resonator wall portions 41 which define the re-entrant section. Additionally it is desirable that this particular wall portion 41 be thin compared to the thickness of the remaining resonator wall portions.

Located external to the resonator 31 a radiation source 23 and support therefor is situated adjacent the thin resonator wall portion and the dielectric material and movable with respect thereto either manually or by means of a solenoid supplied with signals from a modulation source. The high energy emission produced by the source 23 may be collimated if desired (by means not shown) to successively penetrate the thin resonator wall 41 and the dielectric disk 39. With a substantial distance between the resonator and the source (or with an absorber positioned therebetween) the conductivity and dielectric constant of the dielectric may be controlled as described previously and the resonator energy may be modulated in amplitude and frequency. With the source positioned relatively close to the resonator and/or with absorbers removed the number of free electric charges created in the dielectric is increased considerably. This results in a change in the material conductivity and dielectric constant and a change in the amplitude and frequency of the oscillations.

In Figure 3 a further embodiment of the invention is illustrated which includes an envelope (not shown) containing a double-gap klystron 43 having a cathode 45, an electrode 47 for focusing an electron beam produced by the cathode, and a cavity resonator 49. The resonator 49 is divided into two sections 50 and 52 by a circular metallic disk 51 having an aperture adapted to support a drift tube 53, an aperture which contains a dielectric plug 55, and a feedback aperture 57.

In operation the D.-C. electron beam produced by the cathode 45 is convergently focused by electrode 47 and passes through the input gap 59 of the resonator. The resonator section 50 initially is excited by the beam passing through the input gap 59 and begins to produce oscillatory energy in resonator section 50 which in turn velocity modulates the D.-C. beam. In the drift tube 53 the velocity modulation of the electron beam is translated into beam density modulation which includes a radio-frequency component capable of causing oscillation in the second resonator section 52. This oscillatory energy in resonator section 52 is fed back to the first resonator section 50 via the feedback aperture 57 sustaining oscillations therein. After the electron beam has traversed the drift tube 53 and passed through the resonator output gap 61, a collector electrode 63 is provided for collecting the electrons comprising the beam.

A source 23 of high energy charged particle radiation is located outside the klystron envelope and is positioned such that radiations emitted thereby successively pass through the tube envelope, penetrate a thin wall section 65 of the resonator, and bombard the dielectric plug 55. In this instance, however, the quantity of free electric charges created in the dielectric material is controlled by means of an electrostatic or electromagnetic deflection field rather than by interposing absorbers or by changing the position of the source relative to the dielectric member. To this end a modulation transformer 67 is provided which is responsive to control signals input thereto for supplying deflection signals to a deflection circuit such as a pair of deflection plates 69. The instantaneous potentials applied to this deflection circuitry deflects the high energy charged particles so that either more or less of the particles bombard the dielectric material as desired to change the dielectric constant and/or conductivity of the plug and hence either frequency or amplitude modulate the device. An output coupling probe or loop 71 is provided for coupling the modulated signal energy from the resonator. To obviate the need for extremely high deflection voltages or high strength magnetic deflection fields, the source 23, in this instance, may comprise a compound such as zirconium hydride or a solution of tritium in zirconium which produces negatively charged beta particles having relatively lower energies which particles may be deflected readily by smaller deflection signals.

What is claimed is:

1. Apparatus for modulating the amplitude or frequency of electrical energy comprising, a cavity resonator, means for exciting said cavity resonator to set up electric and magnetic fields therein, a solid dielectric material disposed within said resonator at a point of high electric field strength, said dielectric material having a predetermined electrical conductivity, and a cold source of nuclear emissions for providing primary high energy radiations for bombarding said dielectric material whereby said resonator is modulated by a change in said conductivity to a value different from said predetermined value.

2. Apparatus as claimed in claim 1 wherein said cold source is located external to said resonator.

3. Apparatus as claimed in claim 2 wherein said cavity resonator includes a relatively thin resonator wall portion located between said dielectric material positioned therein and said cold source, said wall portion being substantially permeable to said high energy radiation.

4. Apparatus as claimed in claim 2 including means for adjustably controlling the conductivity of said dielectric material.

5. Apparatus for modulating the amplitude or frequency of electrical energy comprising, a cavity resonator having a re-entrant section, means for exciting said cavity resonator to set up electric and magnetic fields therein, a solid dielectric material disposed in said re-entrant resonator section, said solid dielectric material having a predetermined electrical conductivity, and a cold source of nuclear emissions for providing primary high energy radiation for bombarding said dielectric material whereby said resonator is modulated by a change in said conductivity to a value different from said predetermined value.

6. Apparatus for controlling the amplitude or frequency of electrical energy comprising, a cavity resonator having one wall portion thereof relatively thin compared to remaining wall portions, means for exciting said cavity resonator to set up electric and magnetic fields therein, a solid dielectric material disposed within said resonator at a point of high electric field strength, said dielectric material having a predetermined electrical conductivity, and a cold source of nuclear emissions for providing primary high energy charged particle emissions which penetrate said relatively thin wall resonator wall portion to bombard said dielectric material whereby said resonator is modulated by a change in said conductivity to a value different from said predetermined value.

7. Apparatus as claimed in claim 6 including means for producing a deflection field for controlling the intensity of said high energy charged particle bombardment.

8. Apparatus for modulating the amplitude or frequency of electrical energy comprising, a cavity resonator, means for exciting said cavity resonator to set up electric and magnetic fields therein, a material disposed within said resonator at a point of high electric field strength, said material having a predetermined electrical conductivity, and a cold source of nuclear emissions for providing primary high energy radiations for bombarding said material whereby said resonator is modulated by a change in said conductivity to a value different from said predetermined value.

9. Apparatus for modulating the amplitude or frequency of electrical energy comprising, a cavity resonator, means for exciting said cavity resonator to set up electric and magnetic fields therein, a body of semiconductive material disposed within said resonator at a point of high electric field strength, said semiconductive body having a predetermined electrical conductivity, and a cold source of nuclear emissions for providing primary high energy radiations for bombarding said body whereby said resonator is modulated by a change in said conductivity to a value different from said predetermined value.

10. Apparatus as claimed in claim 9 wherein said cold source is located external to said resonator.

11. Apparatus as claimed in claim 10 wherein said cavity resonator includes a relatively thin resonator wall portion located between said body of semiconductive material positioned therein and said cold source, said wall portion being substantially permeable to said high energy radiation.

12. Apparatus as claimed in claim 10 including means for adjustably controlling the conductivity of said semiconductive material.

13. Apparatus for modulating the amplitude or frequency of electrical energy comprising, a cavity resonator having a re-entrant section, means for exciting said cavity resonator to set up electric and magnetic fields therein, a body of semiconductive material disposed in said re-entrant resonator section, said body of semiconductive material having a predetermined electrical conductivity, and a cold source of nuclear emissions for providing primary high energy radiation for bombarding said semiconductive material whereby said resonator is modulated by a change in said conductivity to a value different from said predetermined value.

14. Apparatus for controlling the amplitude or frequency of electrical energy comprising, a cavity resonator having one wall portion thereof relatively thin compared to remaining wall portions, means for exciting said cavity resonator to set up electric and magnetic fields therein, a body of semiconductive material disposed within said resonator at a point of high electric field strength, said body of semiconductive material having a predetermined electrical conductivity, and a source of nuclear emissions for providing primary high energy charged particle emissions which penetrate said relatively thin resonator wall portion to bombard said semiconductive material whereby said resonator is modulated by a change in said conductivity to a value different from said predetermined value.

15. Apparatus as claimed in claim 14 including means for producing a deflection field for controlling the intensity of said high energy charged particle bombardment.

References Cited in the file of this patent

UNITED STATES PATENTS

| | | |
|---|---|---|
| 2,008,545 | Dobke | July 16, 1935 |
| 2,193,710 | Burnham | Mar. 12, 1940 |
| 2,402,948 | Carlson | July 2, 1946 |
| 2,476,323 | Rack | July 19, 1949 |
| 2,581,305 | Skellett | Jan. 1, 1952 |
| 2,631,246 | Christian | Mar. 10, 1953 |
| 2,643,297 | Goldenstein et al. | June 23, 1953 |
| 2,645,758 | Lindt | July 14, 1953 |
| 2,663,802 | Ohmart | Dec. 22, 1953 |
| 2,670,441 | McKay | Feb. 23, 1954 |

FOREIGN PATENTS

| | | |
|---|---|---|
| 690,965 | Germany | May 11, 1940 |